Figures 5, 6:
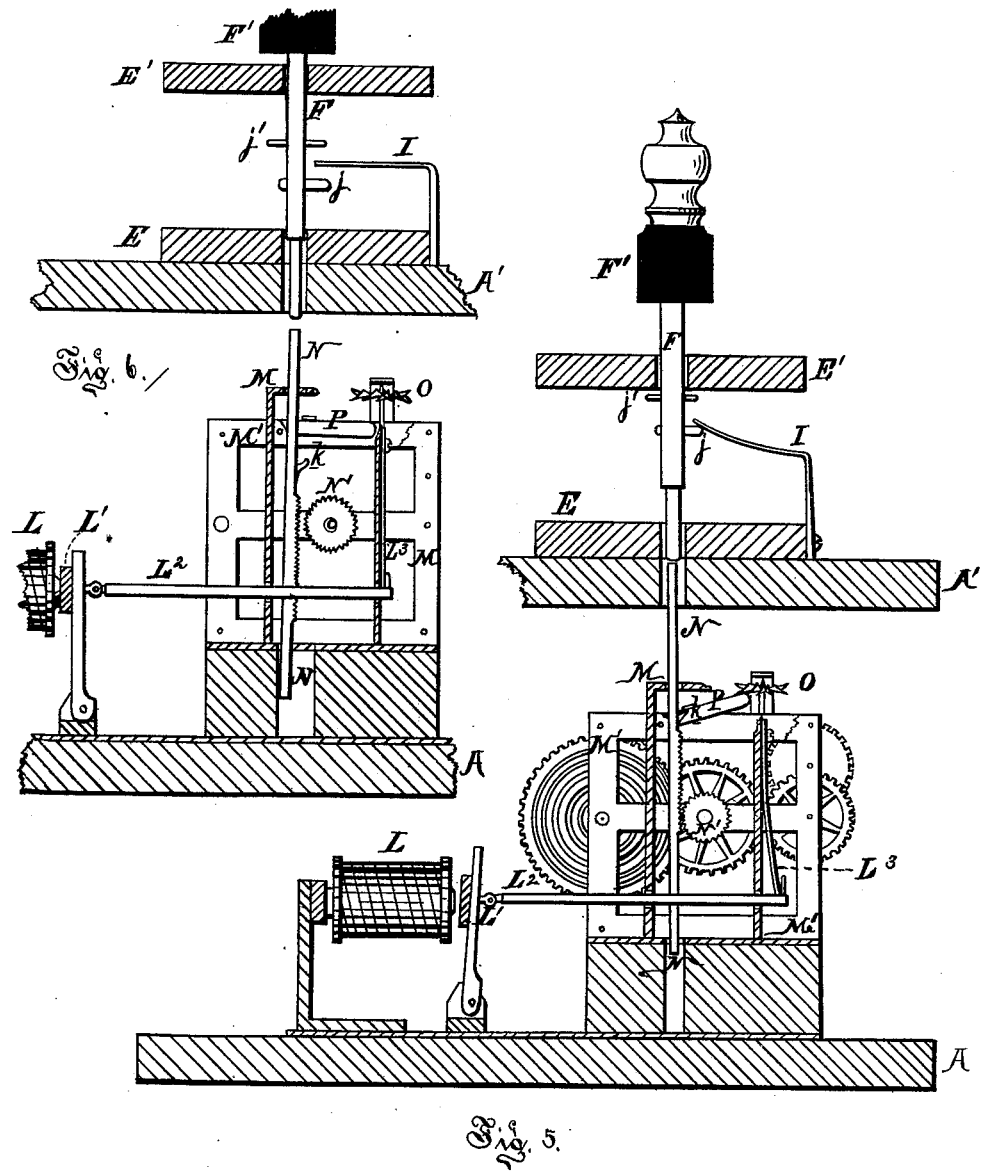

6 Sheets—Sheet 1.
C. H. POND.
FIRE ALARM TELEGRAPH REPEATER.
No. 188,179. Patented March 6, 1877.
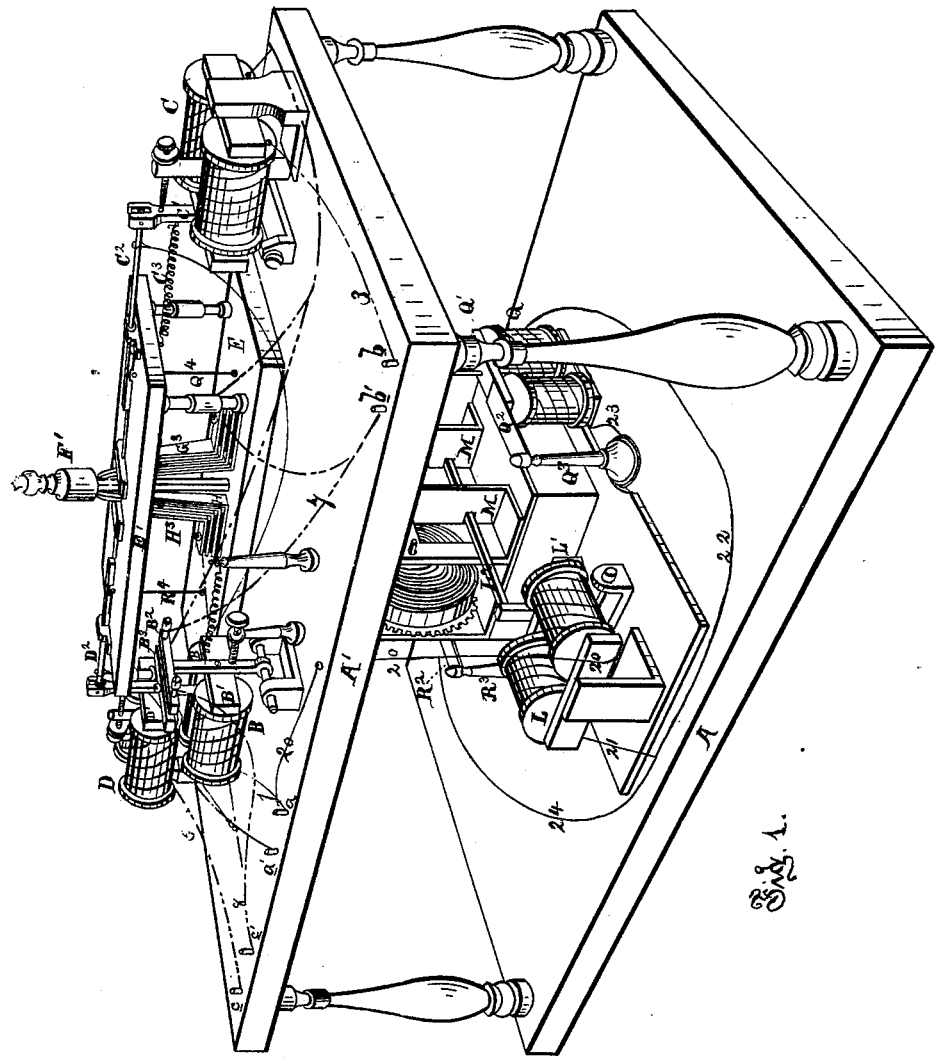
Attest:
H. L. Aulls
Charles H. Hunt
Inventor:
C. H. Pond
By Atty
Thos. S. Sprague
N. PETERS, PHOTO-LITHOGRAPHER, WASHINGTON, D. C.

6 Sheets—Sheet 2.
C. H. POND.
FIRE ALARM TELEGRAPH REPEATER.
No. 188,179. Patented March 6, 1877.
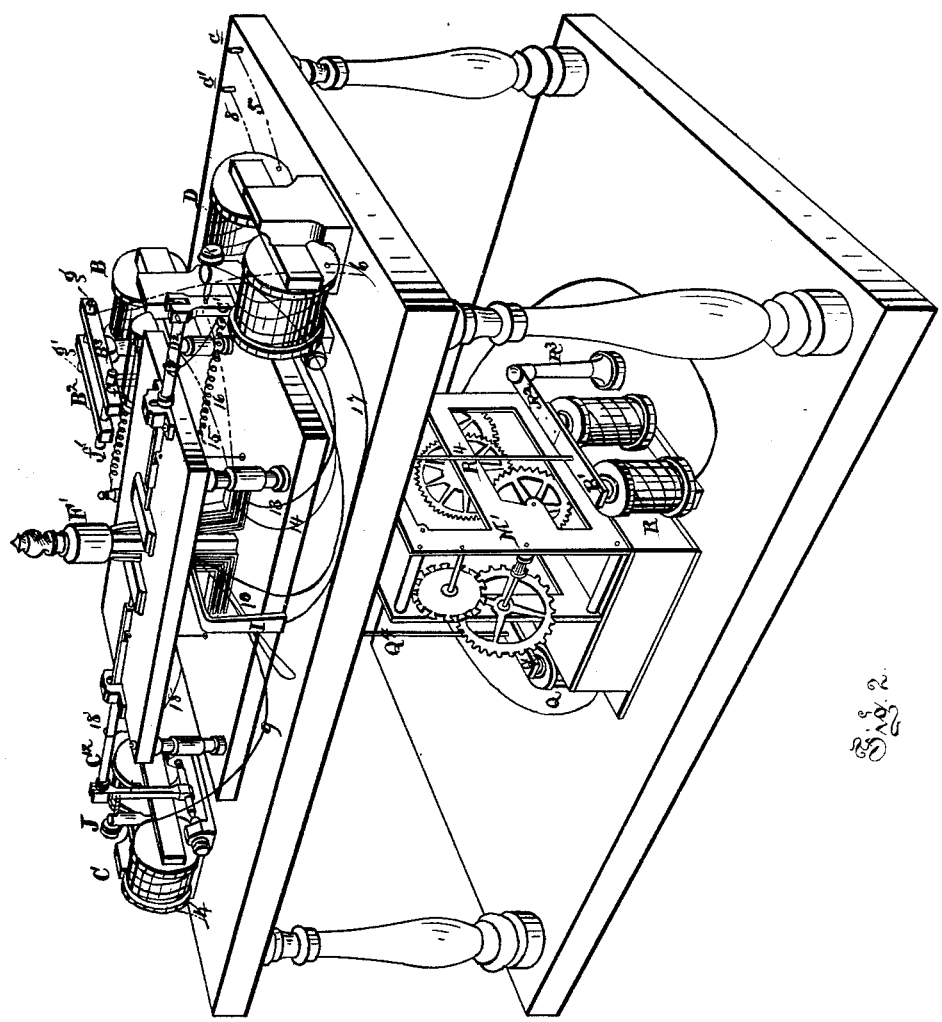

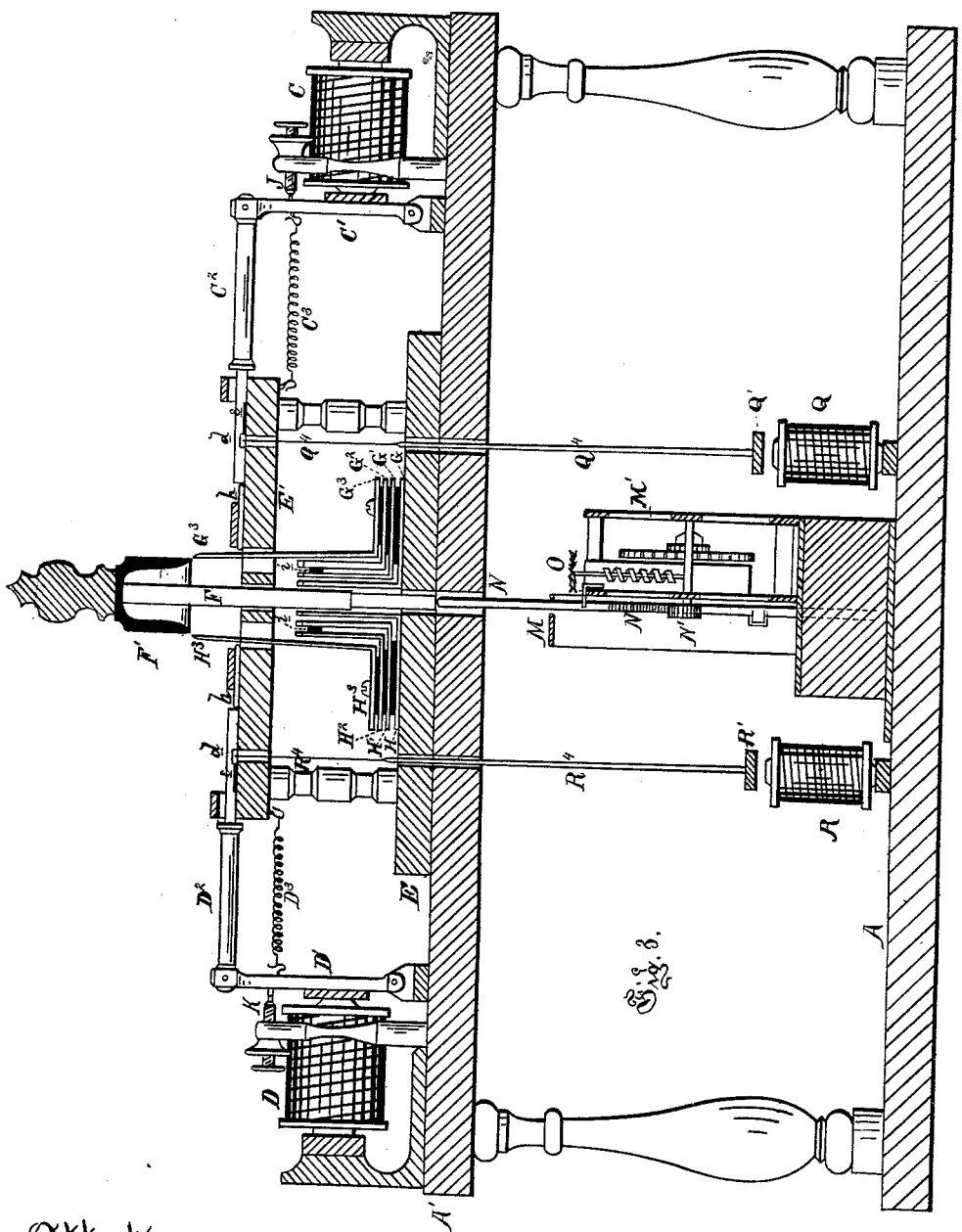

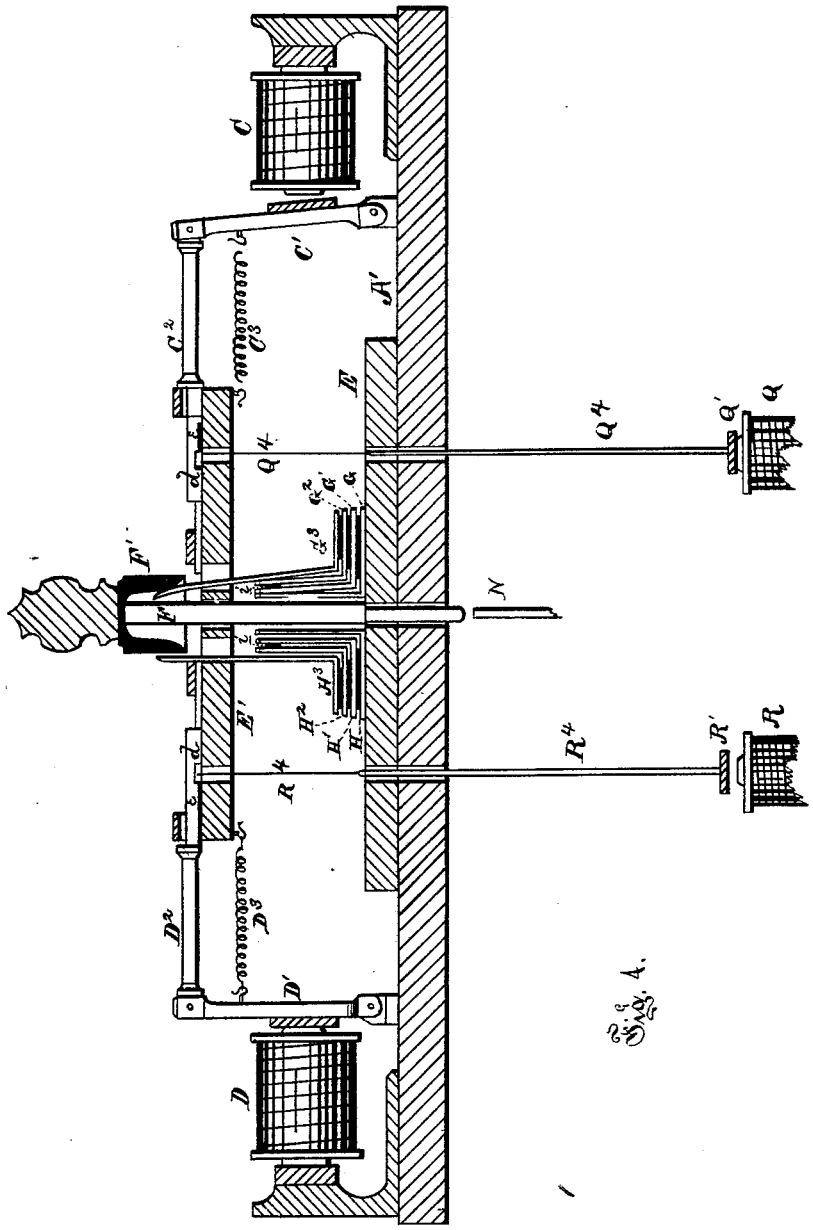

C. H. POND.
FIRE ALARM TELEGRAPH REPEATER.

No. 188,179. Patented March 6, 1877.

6 Sheets—Sheet 6.
C. H. POND.
FIRE ALARM TELEGRAPH REPEATER.
No. 188,179.            Patented March 6, 1877.
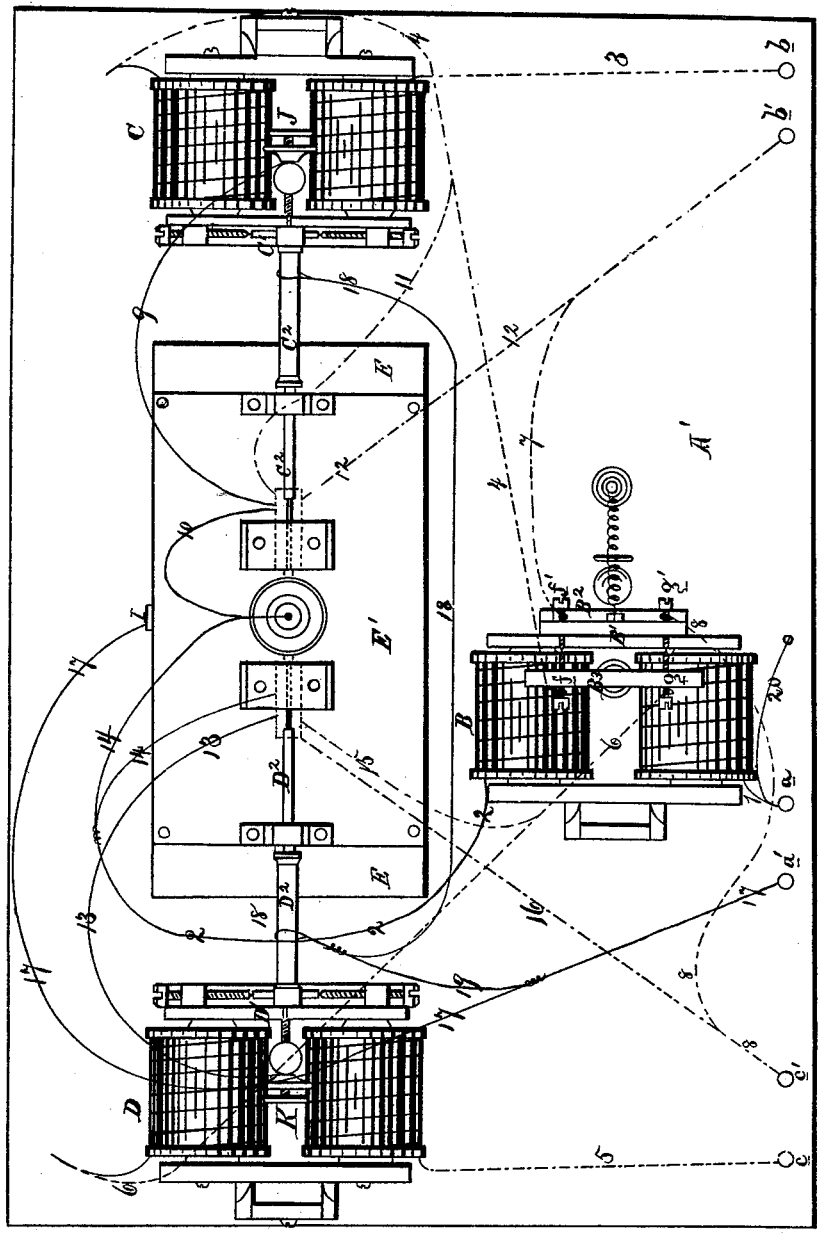

UNITED STATES PATENT OFFICE.

CHESTER H. POND, OF JACKSON, MICHIGAN, ASSIGNOR OF ONE-HALF HIS RIGHT TO CHARLES R. KNICKERBOCKER, AND DOUGLASS GIBSON, OF SAME PLACE.

IMPROVEMENT IN FIRE-ALARM-TELEGRAPH REPEATERS.

Specification forming part of Letters Patent No. 188,179, dated March 6, 1877; application filed February 26, 1877.

*To all whom it may concern:*

Be it known that I, CHESTER H. POND, of Jackson, in the county of Jackson and State of Michigan, have invented an Improvement in Repeaters for Fire-Alarm Telegraphs, of which the following is a specification:

The nature of my invention relates to an improvement in devices of that class known as "repeaters" for transmitting the signals made upon one loop or alarm-circuit to the other loops of the electro-magnetic fire-alarm system.

The object I have in view is to render the repeater non-interfering—that is to say, that, while an alarm-signal is being transmitted from one loop to the others, it will not be possible to transmit a signal from any loop other than that in which the circuit was first broken, thus preventing confusion that otherwise would result from the simultaneous reception of different signals.

This I accomplish by operating the transmitter-magnet with a local battery, the control of which is given to the local points of the main-line magnet of that loop in which the circuit is first broken in sending a signal.

Figure 1, Sheet 1, is a front perspective view of my improved repeater. Fig. 2, Sheet 2, is a rear perspective view of the same. Fig. 3, Sheet 3, is a longitudinal vertical section at $x$ $x$, showing the relative positions of the various parts, as when all the circuits are normally closed. Fig. 4, Sheet 4, is a similar section, showing the relative positions of the parts when the circuit at the right is broken in sending a signal. Fig. 5, Sheet 5, is a cross-section at $y\,y$, in Fig. 3. Fig. 6 is a similar section at $z\,z$ in Fig. 4. Fig. 7, Sheet 6, is a plan view.

In the drawing, A represents a base-plate, above which a table, A', is supported by posts at the corners. B is the magnet of the transmitter, and B$^1$ its armature-lever, in the present instance terminating in a horizontal bar, B$^2$, at the top. B$^3$ is a similar but non-conducting bar on the same, mounted on a post between the magnet-spools. $a\,a'$ are binding-posts, to which the wires of a local battery are connected. From the pole $a$ the wire 1 extends to the magnet, and from the latter the other end or pole-wire 2 passes off the other spool.

The device shown represents a two-circuit repeater; but it is evident that it can be constructed to repeat signals upon a greater number of loops.

C and D are, respectively, the main-line magnets of an eastern or a western loop or alarm-circuit, and of which C$^1$ and D$^1$ are the armatures, each mounted on the usual armature-lever, pivoted at the foot between centers. Between these magnets a slab, E, of hard rubber or other non-conducting material, is secured to the table A', and above it a table, E', of similar material, is supported by posts at the corners. At both ends of the table are guides, through which play trip-rods C$^2$ and D$^2$, respectively pivoted to the upper ends of the armature-levers C$^1$ and D$^1$, with their inner ends overlapping said table. The inner end of each is slightly rounded under the fore-foot, back of which there is a notch, $d$, cut in the under side, behind which the lower edge is faced with a non-conducting plate, $e$. C$^3$ and D$^3$ are, respectively, the springs which retract the armatures of the magnets C and D. $b\,b'$ are binding-posts, to which the wires of the circuit, for convenience called the "eastern loop," are secured, and $c\,c'$ are similar binding-posts for the wires of the western loop. From $b$ a wire, 3, extends to the magnet C, whose other pole-wire is indicated at 4. From post $c$ a wire, 5, passes into the magnet D, whose other pole-wire is indicated by 6.

The pole-wire 4 is connected with a local screw-point, $f$, tapped through the non-conducting bar B$^3$, which point is opposed by a point, $f'$, tapped through the bar B$^2$ of the armature-lever of the local magnet. From the point $f'$ a wire, 7, extends to the post $b'$, and thus completes the circuit of the eastern loop. A similar screw-point, $g$, is tapped through the said bar B$^3$, which is opposed by a like screw-point, $g'$, in the armature-lever. The pole-wire 6 of magnet D is attached to the point $g$, and from the point $g'$ a wire, 8, extends to the post $c'$, and thus completes the western circuit. F is a rod, angular in cross-section, playing vertically through slots in A', E, and E', with a conical cap, F', at its top, made of non-conducting material. On the side next the magnet C two shunts are secured to the slab E. These shunts are composed of two L-shaped leaf-springs, G G¹, with an insulating-block between their horizontal arms. Superposed on these are two similar leaves, G² G³, forming the second shunt, with a like insulating-block between their horizontal arms, the vertical arm of G³ being extended upward to play through and above a slot in the table E'. The circuits are closed by forcing the tops of the free leaves G G¹ and G² G³ together, but between the tops of said leaves G¹ and G² an insulating-block, $i$, is interposed to separate the currents. When the rod F, with its cap F', is normally raised, as in Fig. 3, the shunt-leaves are normally apart, and the circuits through them are broken. H H¹ H² H³ are similar shunts on the other side of the rod F.

When the shunt-leaves are apart, if the rod F be dropped, the cap F' will pass down between the extended leaves G³ and H³—which, in practice, cannot occur; but if the main-line circuit is broken on either loop the extended shunt-leaf of that side will be included or inclosed in the cap when it falls, as seen in Fig. 4.

The circuit-closing arrangement for these shunts consists in the push-pins $h$, interposed between the inner ends of the trip-bars C² and D² and the extended shunt-leaves, the said pins $h$ playing in guides on the table E'.

If the circuit be broken in either the eastern or the western loop the armature-spring C³ or D³ will retract the armature, and push forward the trip-rod, which, in turn, through the pin $h$, will push inwardly the extended shunt-leaf of that side, so that when the cap drops it will include the said leaf.

At the rear side of the slab E is secured a cut-off switch, I, in the form of an L-shaped leaf-spring, whose free end is in the path of a stud, $j$, on the rod F, and above which there is a stop-pin, $j'$, to arrest the upward movement of said rod.

The connections of the shunts are as follows: A wire, 9, in contact with the leaf G, is led to the armature check-screw J, tapped through a post between the magnets C. A wire, 10, in contact with the leaf G¹, is led to the stud $j'$ on the rod F. A wire, 11, connects the leaf G² with the main-line wire 4 between the magnet C and the bar B³. A wire, 12, connects the leaf G³ with the wire 7, leading to the binding-post $b'$.

The connections for the west-side shunts are precisely like those of the eastern shunts, and are as follows: A wire, 13, in contact with the leaf H, is led to an armature check-screw, K, tapped through a post between the magnets D. A wire, 14, in contact with the leaf H¹, is led to the stud $j$ on the rod F. A wire, 15, connects the leaf H² with the main-line wire 6, between the magnet D and the bar B³. A wire, 16, connects the leaf H³ with the binding-post $c'$. A wire, 17, connects the base of the cut-off I with the binding-post $a'$ of the local battery. A wire, 18, connects the trip-rod C² with the trip-rod D², and this wire is, in turn, connected by a wire, 19, with the wire 17.

L is a local magnet, placed on the bed-plate A at a right angle with the magnet B above, and with whose pole-wire 1 one of its poles is connected by a wire, 20, its other pole-wire being indicated at 21. L¹ is its armature, to which is pivoted one end of a horizontal bar, L², sliding in a frame, M, with a leaf-spring, L³, for retracting the said armature and bar.

N is a toothed rack-bar, vertically moving through the top of the frame M and a slot in the table A', the cap-bar F resting on its head. The lower part of the rack-bar plays through a slot or notch in the bar L², which vibrates the said rack-bar as it moves one way or the other by the opening or closing of the circuit in the magnet L.

M' is a frame behind the frame M, containing a spring-driven clock-train, one of whose arbors, projecting into the frame M, carries a pinion, N', with which the rack-bar N is brought into mesh when retracted by the spring L³.

In the train there is an Archimedean fly, O, and the motion of the train is arrested by a dog, P, being lifted into contact therewith by a lug, $k$, on the rack-bar, as the latter is elevated by the pinion N'.

Q is a local magnet, vertically placed on the base A, with an armature, Q¹, supported at one end by a leaf-spring, Q², from a post, Q³. A spring rod, Q⁴, passes from the armature up through the table E' into the notch $d$ of the trip-bar C². At the other side of the clock-frame there is a similar magnet, R, with its armature, post, and spring arranged in like manner, except that the latter passes up into the notch $d$ of the trip-bar D². A wire, 22, connected with the pole-wire 21 passes into the magnet Q, whose other pole-wire, 23, is connected with the post Q³. A wire, 24, also connected with the pole-wire 21, passes into the magnet R, whose other pole-wire is connected with the post R³.

When both the eastern and western circuits are closed, (as they normally are,) the positions of the working parts are as follows: The armatures B¹, C¹, and D¹ are attracted toward their respective magnets; the bar F with its cap is raised; the shunts G H, &c., are open; the cut off 1 is in contact with the stud $j$ on the cap-bar; and the magnets L, Q, and R are discharged.

In the normal condition of the eastern loop the current passing in at the post $b$ is carried by the wire 3 through the magnet C; thence by wire 4 to and through the points $f$ $f'$; thence by wire 7 to and out at the post $b$. The shunts G² G³, &c., being open, the current cannot pass through them over wires 11 and 12.

In the normal condition of the western loop the current passing in at the post $c$ passes by wire 5 through the magnet D; thence by wire 6 to and through the points $g\ g'$; thence by wire 8 to post $c'$, and out, avoiding the shunts H, &c., which are open.

During this time the transmitter-magnet B is charged by the local current, whose circuit is made in the following manner: The local current, entering at $a$, passes through wire 1 into said magnet, and out by pole-wire 2 to wire 14, which connects with stud $j$ on the cap-bar F; thence through the cut-off I to wire 17, which conducts it out again at post $a'$. The local current can not then pass through the shunts and wires 9, 10, 13, and 14, by reason of the shunts being open.

To illustrate the working of the device, the current is supposed to be interrupted in sending signals from the eastern loop, as represented in Fig. 4, to be repeated in or transmitted to the western loop. The magnet C being then discharged, the spring $C^3$ retracts the armature, the trip-bar $C^2$ and pin $h$, which pushes in the extended shunt-leaf $G^3$, completing a circuit through the wire 18, the notched trip-bar $C^2$, the spring-rod $Q^4$, and the local magnets Q L, and wire 20, and out at post $a$. The combined resistance of the magnets Q L being less than that of the magnet B, the current takes that course as being the shortest. By thus charging the magnet L, its armature is attracted, and withdraws the rack-bar N from mesh with the pinion N'. The bar N then drops, and with it the cap F', which includes the shunt-leaf $G^3$, as seen in Fig. 4, thus closing the two shunts G $G^1$ and $G^2\ G^3$, and breaking the transmitter-circuit at I, and also releasing the stop from the fly of the train, which is then free to run. The circuit being closed through the magnet Q, its armature is attracted, drawing down the spring-rod $Q^4$ from under the notch in the trip-bar $C^2$, its end passing back under the insulated portion $e$, thereby breaking the circuit through this last-described direction. The transmitter-circuit being now broken, the armature of its magnet B is retracted by its spring, causing a break in the western loop at the points $g\ g'$, and also in the eastern loop at the points $f\ f'$; but this latter break is shunted through the wires 11 and 12, and leaves $G^2\ G^3$ of the shunt, as seen in Fig. 4. The shunts G $G^1$ being now closed, the transmitter-circuit is complete, except at the point J, and is there completed when the interruption ceases at the signal-sending box in the eastern loop. When the circuit is completed at J, the points $f\ f'$ and $g\ g'$ are again brought into contact; hence every opening and closing of the eastern circuit opens and closes the transmitter-circuit, which in turn sends these openings and closings upon the western circuit through said points $g\ g'$.

From the foregoing description it will be evident that, in order to have any loop or main-circuit control, or in any manner affect the transmitter, the shunts for that circuit must be closed, by having the outer extended shunt-leaf included in the lowered cap F'; hence, it follows that, as the trip-bar $C^2$, at each retraction closes the circuit through the local magnet L, and drops the rack-bar N, as hereinbefore described, the cap F' can not rise high enough to release the shunt-leaf while alarm-signals are being sent, it is, of course, understood that the rising of said rack-bar, by the clock-train, will be properly adjusted in point of time. The clock-train, when once set in motion, continues to run until after signals have ceased to come in, when the bar will be run up to its normal position, when the train will be stopped by the means described.

In case of a permanent break in either loop, the cap drops and includes its shunt-leaf, as described. Then, when the circuit is broken in the local magnets below, the trip-rod raises the trip-bar of that loop out of the way of its push-pin $h$, which is then free to be moved back by the shunt-leaf when the cap rises to free it, the whole fire-alarm system remaining open until the cap does so rise.

When the repeater is employed in connection with a considerable number of loops or alarm-circuits, in lieu of having the transmitting-points $f\ g$, &c., on the armature-lever, as described, they may be arranged around a balanced ring playing on a vertical cylinder, the said ring being actuated by the transmitter-magnet.

What I claim as my invention is—

In a fire-alarm-telegraph repeater, substantially as described, a transmitter actuated by a local battery, in combination with the main-line magnets, the control of said transmitter being given to the local points of that loop in the alarm-system in which the electric circuit is first interrupted, substantially as and for the purpose set forth.

CHESTER H. POND.

Witnesses:
H. F. EBERTS,
H. S. SPRAGUE.